United States Patent
Stege

(10) Patent No.: US 11,121,455 B2
(45) Date of Patent: Sep. 14, 2021

(54) SPACE-INDEPENDENT COUPLING ANTENNA

(71) Applicant: VOLKSWAGEN AG, Wolfsburg (DE)

(72) Inventor: Ulrich Stege, Wittingen (DE)

(73) Assignee: VOLKSWAGEN AG

( * ) Notice: Subject to any disclaimer, the term of this patent is extended or adjusted under 35 U.S.C. 154(b) by 0 days.

(21) Appl. No.: 15/703,584

(22) Filed: Sep. 13, 2017

(65) Prior Publication Data

US 2018/0076511 A1    Mar. 15, 2018

(30) Foreign Application Priority Data

Sep. 14, 2016   (DE) .................. 10 2016 217 498.3

(51) Int. Cl.
| | | |
|---|---|---|
| *H01Q 1/38* | (2006.01) | |
| *H01Q 1/32* | (2006.01) | |
| *B60R 16/02* | (2006.01) | |
| *H04B 5/00* | (2006.01) | |
| *B60R 11/00* | (2006.01) | |

(52) U.S. Cl.
CPC ........... *H01Q 1/32* (2013.01); *B60R 16/0207* (2013.01); *H01Q 1/3275* (2013.01); *H01Q 1/3291* (2013.01); *B60R 11/00* (2013.01); *B60R 2011/0005* (2013.01); *B60R 2011/0007* (2013.01); *B60R 2011/0015* (2013.01); *B60R 2011/0021* (2013.01); *H04B 5/0031* (2013.01)

(58) Field of Classification Search
CPC .... H01Q 1/1271; H01Q 1/3275; H01Q 1/325; H01Q 1/3291; H01Q 1/38; H01Q 1/3283; H01Q 1/3241; H01Q 15/14; H01Q 15/24
USPC ................... 343/713, 711, 872, 893
See application file for complete search history.

(56) References Cited

U.S. PATENT DOCUMENTS

| | | | | |
|---|---|---|---|---|
| 4,086,595 A | * | 4/1978 | Cherenko | B32B 17/10018 343/713 |
| 5,600,333 A | * | 2/1997 | Justice | H01Q 1/1285 343/713 |
| 6,346,919 B1 | * | 2/2002 | Wang | H01Q 1/3275 343/700 MS |
| 7,852,269 B2 | * | 12/2010 | Tsutsui | H01Q 1/40 343/700 MS |

(Continued)

FOREIGN PATENT DOCUMENTS

| | | |
|---|---|---|
| DE | 69004940 T2 | 3/1994 |
| DE | 10084156 T1 | 2/2002 |

(Continued)

OTHER PUBLICATIONS

Search Report for German Patent Application No. 10 2016 217 498.3, dated Feb. 21, 2017.

*Primary Examiner* — Linh V Nguyen

(74) *Attorney, Agent, or Firm* — Barnes & Thornburg LLP

(57) ABSTRACT

A transport mechanism and an antenna arrangement for facilitating the transmission/reception of a portable wireless communication device temporarily arranged in a passenger compartment of a transport. The antenna arrangement includes a supporting body having a shelf area and a flat antenna having an interface, wherein the shelf area holds the wireless communication terminal, the flat antenna is arranged parallel to the shelf area on or in the supporting body, and the interface connects via a wiring harness of the transport to an external antenna of the transport.

12 Claims, 3 Drawing Sheets

(56) References Cited

U.S. PATENT DOCUMENTS

| | | | | |
|---|---|---|---|---|
| 2002/0065039 | A1* | 5/2002 | Benezech | G01N 35/00871 |
| | | | | 455/15 |
| 2002/0080072 | A1* | 6/2002 | Zhang | H01Q 21/064 |
| | | | | 343/700 MS |
| 2006/0176225 | A1* | 8/2006 | Annamaa | H01Q 1/3291 |
| | | | | 343/702 |
| 2007/0097001 | A1* | 5/2007 | Sugimoto | H01Q 21/28 |
| | | | | 343/713 |
| 2008/0284665 | A1* | 11/2008 | Pfletschinger | H01Q 1/325 |
| | | | | 343/713 |
| 2009/0117946 | A1* | 5/2009 | Tomasini | H04M 1/04 |
| | | | | 455/569.2 |
| 2009/0243946 | A1* | 10/2009 | Kagaya | H01Q 1/3291 |
| | | | | 343/713 |
| 2013/0127684 | A1* | 5/2013 | Li | H01Q 9/04 |
| | | | | 343/873 |
| 2014/0058586 | A1* | 2/2014 | Kalhous | G07C 9/00309 |
| | | | | 701/2 |
| 2015/0029067 | A1 | 1/2015 | Pang et al. | |
| 2016/0020505 | A1* | 1/2016 | Szakelyhidi | A61N 1/3904 |
| | | | | 343/702 |
| 2017/0324431 | A1* | 11/2017 | Solan | H04B 1/3877 |
| 2018/0013871 | A1* | 1/2018 | Robillard | B60R 11/02 |
| 2018/0083493 | A1* | 3/2018 | Hwang | H01Q 7/00 |

FOREIGN PATENT DOCUMENTS

| | | |
|---|---|---|
| DE | 102004033009 A1 | 9/2005 |
| DE | 102010027620 A1 | 1/2012 |
| DE | 102011120250 A1 | 6/2013 |
| DE | 102012112266 B3 | 4/2014 |
| DE | 102013215727 A1 | 2/2015 |
| EP | 1964209 A2 | 9/2008 |
| EP | 2011243 A1 | 1/2009 |
| GB | 2517791 A | 3/2015 |

* cited by examiner

SPACE-INDEPENDENT COUPLING ANTENNA

PRIORITY CLAIM

This patent application claims priority to German Patent Application No. 10 2016 217 498.3, filed 14 Sep. 2016, the disclosure of which is incorporated herein by reference in its entirety.

SUMMARY

Illustrative embodiments relate to a seamlessly fitted antenna arrangement for improving the transmission/reception properties of a portable wireless communication terminal temporarily arranged in a passenger compartment of a mechanism for transport and to a corresponding mechanism of transport. Illustrative embodiments also provide a reduction of cost, installation space and weight and to a reduction of the diversity of embodiments in automobile construction.

BRIEF DESCRIPTION OF THE DRAWINGS

Exemplary embodiments are described in detail below with reference to the appended drawings, in which.

DETAILED DESCRIPTION

Figure 1:
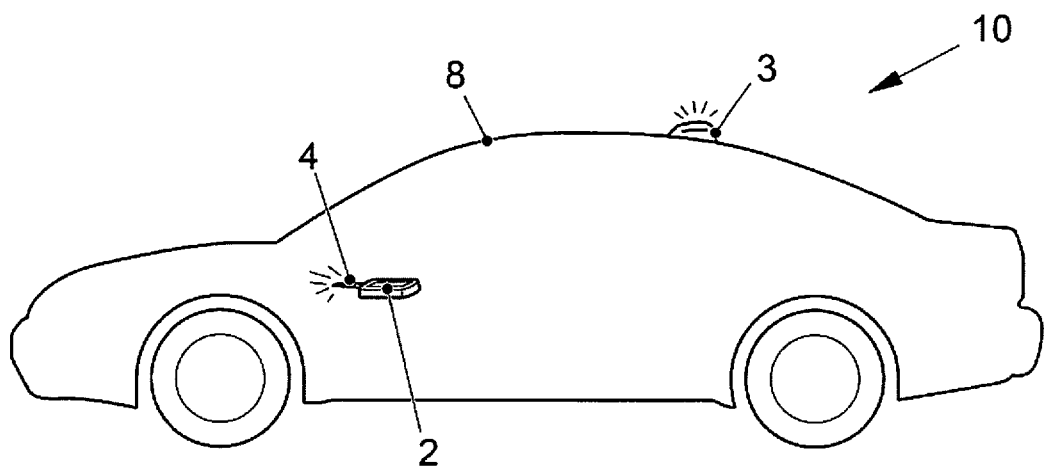
FIG. 1 shows a schematic depiction of an exemplary embodiment of a transport.

When a wireless communication terminal is introduced into the passenger compartment of an automobile, the bodywork and the (sometimes metal-coated) panes of glass attenuate the electromagnetic signals that are transmitted by the wireless communication terminal or are meant to be received thereby. One approach involves a coupling antenna that is introduced into the transport as a box and is provided for holding the mobile phone. This coupling box has an antenna that picks up the signals emitted by the mobile phone, boosts them if need be and forwards them to an antenna arranged externally on the vehicle. Accordingly, wireless communication signals received by the external antenna can be forwarded to the antenna of the mobile phone via the coupling box. The wired forwarding between the external antenna and the coupling antenna in the coupling box overcomes, so to speak, the shielding by the passenger compartment and the panes. Since the coupling box is associated with not inconsiderable component costs, such an apparatus is usually offered as special equipment. Vehicles that have no such coupling box therefore give away valuable installation space.

The document GB 2517791 A1 proposes a signal booster for a vehicle.

The document DE 10 2011 120 250 A1 proposes a telephone antenna coupling plate for a vehicle.

The document DE 10 2012 112 266 B3 proposes a coupling antenna arrangement and a receiving holder for a hands-free device.

DE 10 2004 033 009 A1 discloses a vehicle device having a vehicle box that is mounted in the vehicle interior and that has an antenna for wireless communication with an external capture device. The vehicle box can be inserted into a bracket that has an internal antenna connectable to an external antenna. The internal antenna is contactlessly coupled to the antenna of the vehicle box as soon as the vehicle box is inserted into the bracket.

The disclosed embodiments overcome the drawbacks of the prior art.

Disclosed embodiments provide an antenna arrangement for improving the transmission/reception properties of a portable wireless communication terminal temporarily arranged in a passenger compartment of a transport.

The transport may be a car, a transporter, a truck, an aircraft and/or a watercraft, for example. The passenger compartment may be made of metal, which promotes shielding of electromagnetic signals. The wireless communication terminal may be a hand-held radio, a smartphone, a tablet or the like. The antenna arrangement comprises a supporting body having a shelf area for the wireless communication terminal. The shelf area can have essentially any orientation to hold the wireless communication terminal. Further, a flat antenna having an interface is provided. The flat antenna has an essentially planar orientation. The flat antenna is oriented in a predefined manner with respect to the shelf area. The flat antenna may be arranged in or on the supporting body. The supporting body can be understood as a structure that, independently of a scope of special equipment, is an inner surface of the transport or of the passenger compartment of the transport. The interface of the flat antenna is set up to be connected via a wiring harness of the transport to an external antenna of the transport. In this way, an electrical, in particular direct electrical, connection between the flat antenna and the external antenna of the transport is provided by which it is possible to overcome the shielding of the passenger compartment from electromagnetic radiation. At the very least, the attenuation by the passenger compartment is significantly reduced by the disclosed antenna arrangement. The interface can have a plug connection, a solder joint, a crimp connection or the like to the wiring harness, for example. The use of a flat antenna, which has no dimensional stability of its own but rather is shaped/stabilized by the supporting body in the region of the shelf area, can provide an almost seamlessly fitted antenna arrangement, which decreases mutually exclusive scopes of special equipment for the transport. This increases the economic viability of a vehicle project. In addition, the mass and the amount of energy involved for the operation of the transport can be decreased. Alternatively or additionally, multiple shelf areas can be set up within the transport, while the introduction of mass and the costs are kept down. The supporting body is of multilayer construction in this case to convey an agreeable haptic user impression. By way of example, a plastic and/or elastic material can be provided as a part of the supporting body that faces the shelf area, and may be completed with a layer of leather, artificial leather, a grained surface or the like in the direction of the passenger compartment, for example. A layer of the supporting body that is averted from the shelf areas can be provided for the robustness and dimensional fidelity of the antenna arrangement, for example. This part of the supporting body can be made of or comprise plastic, fiber composite material or the like, for example. The plastically deformable or elastic layer can comprise a foam, particularly PVC or the like, for example.

The shelf area may be embodied as the bottom of a storage compartment, for example. Such storage compartments can be found in central consoles, dashboards, door interior panels and in the roof console on the roof lining of the vehicle, for example. Armrests may also have storage compartments (e.g., in the second or third row of seats of the transport) arranged in them. In addition, luggage nets (e.g., on the gearbox channel or on the seat back, at the side or at the rear of the backrests of the vehicle seats) can be extended by an antenna arrangement. Ultimately, wireless communication terminals positioned in the region of antenna arrangements provide a more robust and energy-efficient wireless communication link (or readiness), which means that customer acceptance and/or battery charging cycles are improved. If the voice link via loudspeakers/microphones of the transport is used or only data links between the transport and the wireless communication terminal are meant to be used, the disclosed antenna arrangement will attain the aforementioned benefits during voice and data transmission too.

The flat antenna may be arranged on a surface of the supporting body that is opposite the shelf area, for example. In other words, in the case of a horizontal shelf area, the flat antenna may be arranged on an underside of the supporting body. There, it is possible for the flat antenna to be firmly glued, clipped, pressed in, foamed in or secured in an alternative manner, for example, without substantial installation space being given up or the visual impression of the interior being impaired.

The supporting body may be of multilayer construction, for example, to convey an agreeable haptic user impression. By way of example, a plastic and/or elastic material can be provided as a part of the supporting body that faces the shelf area, and can be completed with a layer of leather, artificial leather, a grained surface or the like in the direction of the passenger compartment, for example. A layer of the supporting body that is averted from the shelf areas may be provided for the robustness and dimensional fidelity of the antenna arrangement, for example. This part of the supporting body can be made of or comprise plastic, fiber composite material or the like, for example. The plastically deformable or elastic layer can comprise a foam, particularly PVC or the like, for example.

The interface of the flat antenna may be accessible from a side of the supporting body that is averted from the shelf area. By way of example, a plug-in device may be fixed on a dimensionally solid part of the supporting body to be able to perform installation of the wiring harness on the flat antenna one-handed. In other words, the interface may be mechanically fixed on the supporting body and, to this end, have an adhesive joint, rivet joint, etc.

The supporting body may be part of a dashboard and/or of a door panel and/or of a central console and/or of a backrest and/or of a seat panel and/or of a roof lining of the transport. Fundamentally, all surface regions bounding the passenger compartment internal volume come into consideration. The flat antenna can comprise a foil that has an electrical conductivity. Regions of the foil that correspond to the actual antenna shape may be provided with a higher conductivity value than other foil regions that are essentially provided for stabilizing and installation of the antenna. By way of example, a self-adhesive layer may be applied to the foil that is exposed shortly before installation. The flat antenna can also have a wire structure that runs substantially in one plane. Fundamentally, thin, curved areas should also be understood as possible forms of the flat antenna, however. Depending on production methods, the flat antenna can be embodied as a lacquer layer on the supporting body or a separate substrate.

According to a second embodiment, a transport is proposed that has a disclosed antenna arrangement as has been described in detail in connection with the first-mentioned embodiment. The features, combinations of features and the resultant benefits correspond, as can be seen, to those of the antenna arrangement such that reference is made to the explanations above to avoid repetition.

A further proposed option is that of weaving the flat antenna into materials that are subsequently employed for use in the interior of the transport. By way of example, seat covers, roof linings, interior panels or the like can be covered with a material equipped in this manner and can be employed to improve reception properties.

The flat antenna can be secured to the supporting body, in the supporting body or on the supporting body by adhesive bonding, welding or clipping. It can be foamed in beneath what is known as a slush skin. If the flat antenna is arranged on the supporting body, the latter can be concealed from view by a shelf mat placed on/in it, for example. This can also improve slip resistance for the wireless communication terminal with respect to the supporting body. Depending on the way in which the flat antenna is introduced or fitted into the transport, the foil may already be attached to the wiring harness or can be electrically connected to the wiring harness after the foil has been positioned.

FIG. 1 shows a car 10 as an exemplary embodiment of a transport that has an external antenna 3 for transmitting and receiving wireless communication signals. Arranged in the interior of the passenger compartment 8 of the car 10 is a mobile phone 2 as a wireless communication terminal, the local antenna 4 of which transmits wireless communication signals that are significantly attenuated by the passenger compartment 8.

Figure 2:
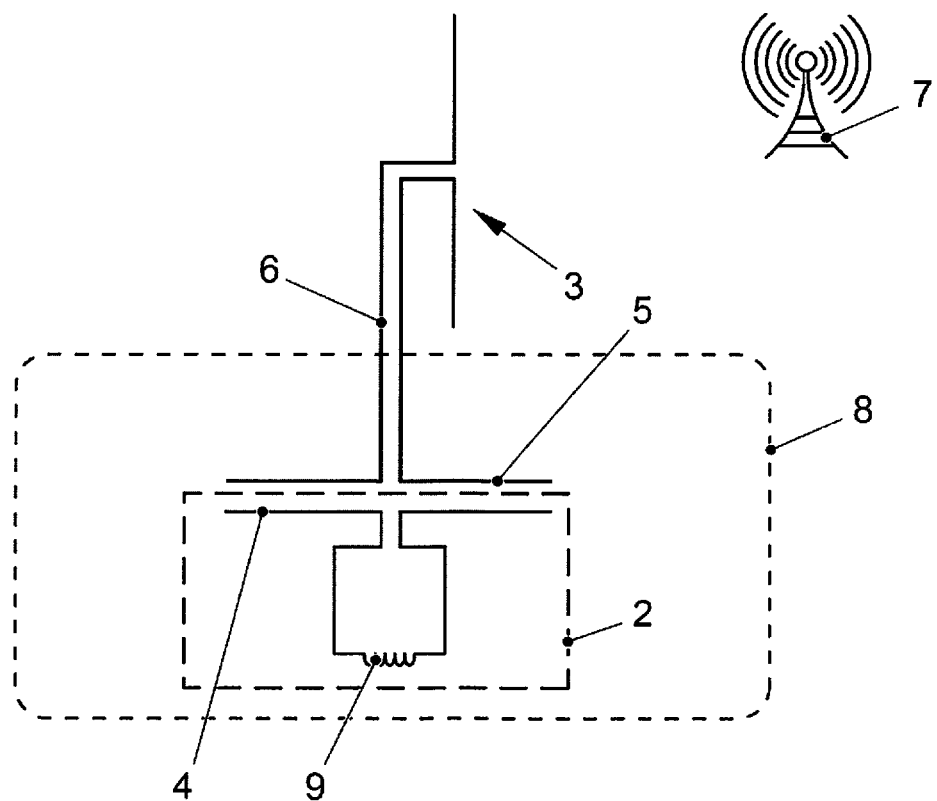
FIG. 2 shows a schematic depiction of electrical elements of an exemplary embodiment of a disclosed antenna arrangement.

FIG. 2 shows a schematic depiction of electrical components of a disclosed antenna arrangement and of a terrestrial transmission mast 7 of a mobile communication provider. Outside the electromagnetically shielding passenger compartment 8 there is the external antenna 3 of the transport. A wiring harness 6 electrically connects the external antenna 3 to a coupling antenna 5 situated inside the passenger compartment 8. The coupling antenna is physically adjacent to a local antenna 4 of a mobile phone 2 and hence electromagnetically coupled to the local antenna. The local antenna 4 of the mobile phone 2 forms a resonant circuit with an inductance 9 of the mobile phone 2. The essentially parallel arrangement of the antennas 4, 5 results from the mobile phone 2 being stored on the shelf area (not depicted), with which the coupling antenna 5 is also arranged in parallel.

Figure 3:
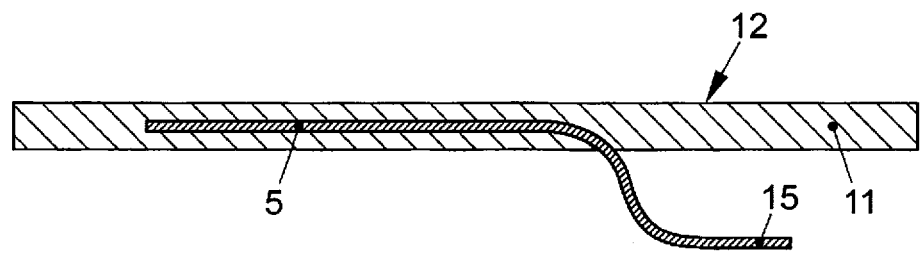
FIGS. 3 to 10 show sectional detail views illustrating arrangement and attachment embodiments for a flat antenna that are possible in a disclosed antenna arrangement.

FIG. 3 shows a sectional depiction of a coupling antenna 5 that is injection molded into a supporting body 11. The interface 15 is routed out on a side of the supporting body 11 that is opposite the shelf area 12. The coupling antenna 5 itself consists of an electrically conductive strip and a carrier foil (not depicted separately).

Figure 4:
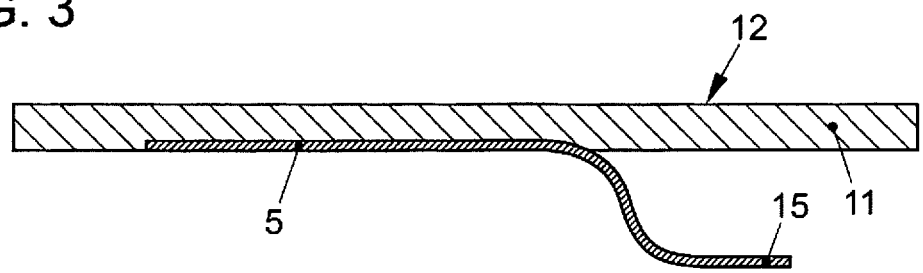

FIG. 4 shows a sectional depiction of a coupling antenna 5 onto which a supporting body 11 is injection molded directly. In other words, the supporting body 11 has been injection molded in at least partially liquid form onto the opposite surface of the coupling antenna 5. In this case, the interface 15 has been routed out from the supporting body 11.

Figure 5:
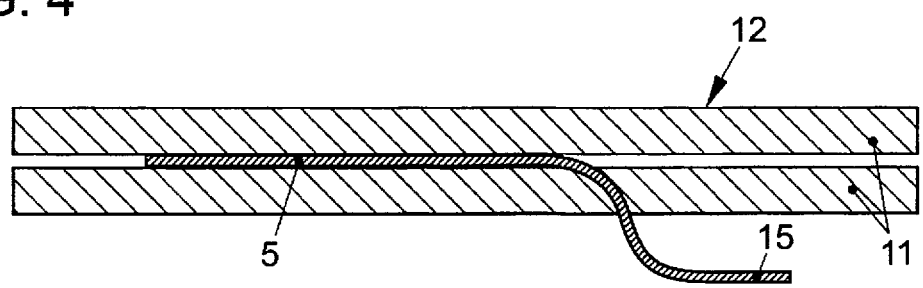

FIG. 5 shows a sectional depiction of a coupling antenna 5 that is inserted into a two-layer structure of a supporting body 11. The interface 15 is routed out through the lower layer of the supporting body 11 on a side opposite the shelf area 12.

Figure 6:
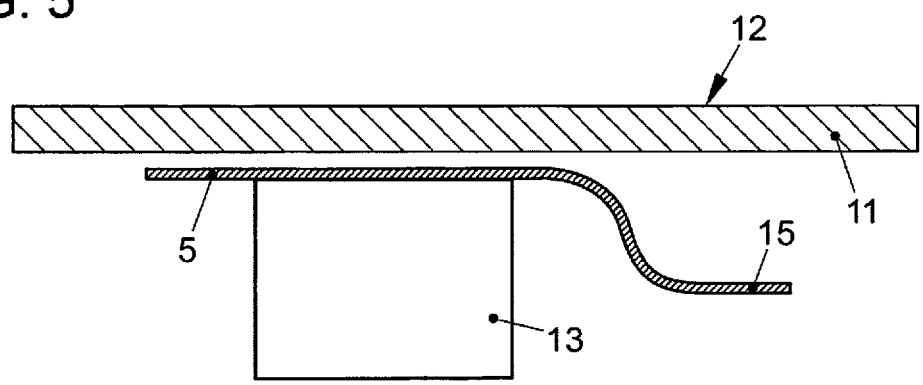

FIG. 6 shows a sectional depiction of a disclosed antenna arrangement in which the coupling antenna 5 is applied to a ventilation channel 13 beneath the supporting body 11. By way of example, the supporting body 11 may be a bottom of a storage compartment in the region of a central console of a transport.

Figure 7:
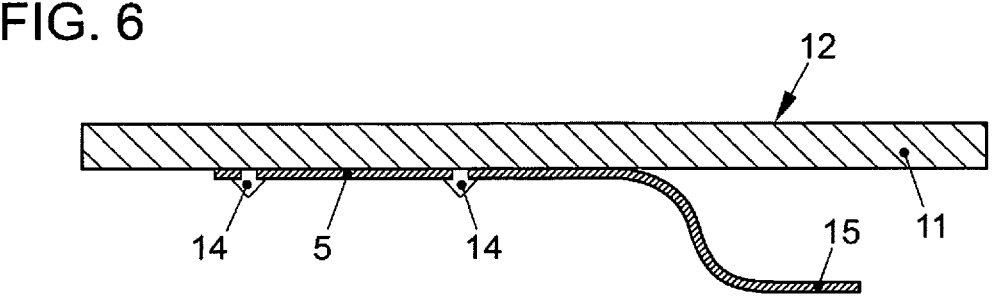

FIG. 7 shows a sectional depiction of a disclosed antenna arrangement in which the flat antenna 5 is secured to the underside of the supporting body 11 by two clips 14.

Figure 8:
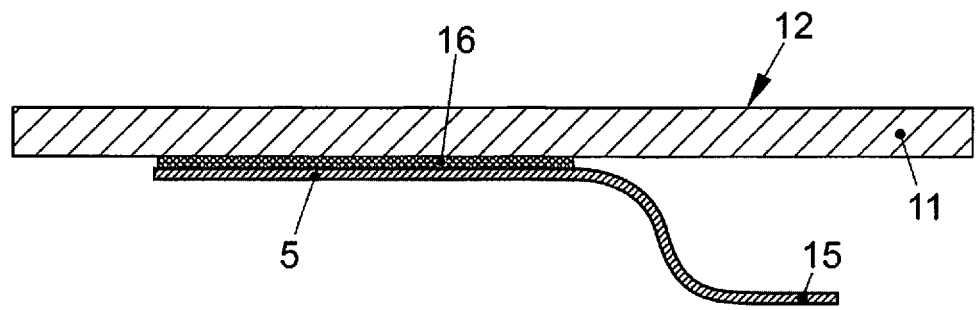

FIG. 8 shows a sectional depiction of a disclosed antenna arrangement in which the flat antenna 5 is adhesively bonded onto an underside of the supporting body 11. An adhesive 16 is arranged over the full area between the flat antenna 5 and the supporting body 11.

Figure 9:
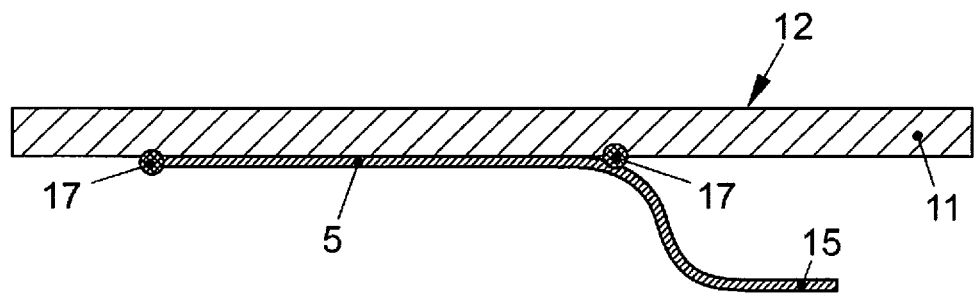

FIG. 9 shows a sectional depiction of a disclosed antenna arrangement in which the flat antenna 5 is welded to an underside of the supporting body 11. Weld seams or weld spots 17 ensure a material bond between the foil of the flat antenna 5 and the supporting body 11.

Figure 10:
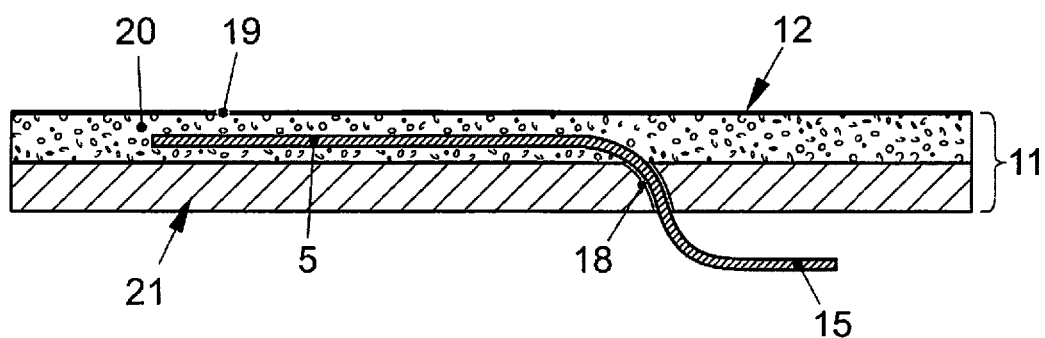

FIG. 10 shows a sectional depiction of a disclosed antenna arrangement in which the flat antenna 5 is sprayed into a PU foam 20 of a PVC skin 19. The PVC skin 19 provides the shelf area 12. The PU foam 20 ensures agreeable haptics for the supporting body 11, the formative structure 21 of which has a passage 18 through which the interface 15 is routed.

Even if the embodiments have been described in detail in conjunction with the appended figures of the drawing, modifications and combinations of features of the depicted exemplary embodiments are possible for a person skilled in the art without departing from the scope of the disclosure, the scope of protection of which is defined by the appended claims.

LIST OF REFERENCE SYMBOLS

2 Smartphone
3 External antenna
4 Local antenna
5 Flat antenna
6 Wiring harness
7 Transmission mast
8 Passenger compartment
9 Inductance
10 Car
11 Supporting body
12 Shelf area
13 Air channel
14 Clip
15 Interface
16 Adhesive
17 Weld spot
18 Duct
19 PVC skin
20 PU foam
21 Solid structure

The invention claimed is:

1. An antenna arrangement that facilitates transmission/reception by a portable wireless communication terminal temporarily arranged in a passenger compartment of a transportation vehicle, the antenna arrangement consisting of:
a supporting body having a shelf area; and
a planar wire structure that forms a flat antenna having a coupling antenna and an interface, wherein
the shelf area holds the wireless communication terminal,
the flat antenna is arranged parallel to the shelf area in the supporting body,
the interface configured to connect via a wiring harness of the transportation vehicle to an external antenna of the transport, and
the supporting body is of multilayer construction and is injection molded directly onto the coupling antenna so that the coupling antenna arranged directly between and contacting a first layer, facing the shelf area, and a second layer, averted from the shelf area, of the supporting body, and wherein the flat antenna is provided with a dimensional shape by the supporting body and the shape is stabilized by the supporting body.

2. The antenna arrangement of claim 1, wherein the shelf area is a bottom of a storage compartment within the passenger compartment of the transportation vehicle.

3. The antenna arrangement of claim 1, wherein the interface is accessible from a side of the supporting body that is averted from the shelf area.

4. The antenna arrangement of claim 1, wherein the supporting body is part
of a dashboard, and/or
of a door panel, and/or
of a central console, and/or
of a seat or of a seat back, and/or
of a side panel.

5. The antenna arrangement of claim 1, wherein the flat antenna comprises:
a foil antenna, and/or
a planar wire structure, and/or
an electrically conductive, cured lacquer layer.

6. The antenna arrangement of claim 1, wherein the flat antenna is applied to a carrier foil that has a self-adhesive layer.

7. A transportation vehicle comprising:
a passenger compartment; and
an antenna arrangement that facilitates transmission/reception by a portable wireless communication terminal temporarily arranged in the passenger compartment, the antenna arrangement comprising:
a supporting body having a shelf area; and
a flat antenna having an interface, wherein
the shelf area holds the wireless communication terminal on the supporting body parallel to the flat antenna,
the flat antenna is arranged parallel to the shelf area in the supporting body,
the interface configured to connect via a wiring harness of the transportation vehicle to an external antenna of the transport, and
the supporting body is of multilayer construction and the flat antenna is arranged within a first layer, facing the shelf area, and on a second layer, averted from the shelf area, of the supporting body,
wherein the first layer comprises a polyurethane foam, and
wherein the supporting body further comprises a layer of leather, artificial leather, or a grained surface.

8. The transportation vehicle of claim 7, wherein the shelf area is a bottom of a storage compartment inside the passenger compartment.

9. The transportation vehicle of claim 7, wherein the interface is accessible from a side of the supporting body that is averted from the shelf area.

10. The transportation vehicle of claim 7, wherein the supporting body is part
of a dashboard, and/or
of a door panel, and/or
of a central console, and/or
of a seat or of a seat back, and/or
of a side panel.

11. The transportation vehicle of claim 7, wherein the flat antenna comprises:

a foil antenna, and/or an electrically conductive, cured lacquer layer.

12. The antenna arrangement of claim 1, wherein the shelf area is configured to hold the wireless communication terminal parallel to the flat antenna.

* * * * *